United States Patent

Filippi et al.

[11] Patent Number: 6,120,033
[45] Date of Patent: Sep. 19, 2000

[54] PROCESS DIAPHRAGM SEAL

[75] Inventors: Giovanni Filippi; Jon R. Schroeder, both of Brenham, Tex.

[73] Assignee: Rosemount Inc., Eden Prairie, Minn.

[21] Appl. No.: 09/098,830

[22] Filed: Jun. 17, 1998

[51] Int. Cl.[7] .................... F16J 3/00; F16J 15/52
[52] U.S. Cl. ............... 277/315; 277/616; 277/634; 277/637
[58] Field of Search ................. 277/609, 616, 277/627, 630, 634, 637, 650, 315; 92/96, 98 R, 100, 103 R

[56] References Cited

U.S. PATENT DOCUMENTS

| | | |
|---|---|---|
| 3,538,670 | 11/1970 | Morgan . |
| 3,610,108 | 10/1971 | Sorteberg ................................ 92/98 |
| 3,675,540 | 7/1972 | Murata et al. ........................ 92/98 |
| 3,924,518 | 12/1975 | Eberhard et al. ..................... 92/34 |
| 4,046,010 | 9/1977 | Akeley .................................. 73/406 |
| 4,072,057 | 2/1978 | Yasuhara et al. .................... 73/718 |
| 4,136,603 | 1/1979 | Doyle, Jr. ............................. 92/98 |
| 4,169,389 | 10/1979 | Yasuhara et al. .................... 73/718 |
| 4,199,991 | 4/1980 | Kodama ................................ 73/706 |
| 4,262,540 | 4/1981 | Tamai et al. ......................... 73/718 |
| 4,401,858 | 8/1983 | Reynard et al. ..................... 179/111 |
| 4,597,151 | 7/1986 | Zaghi et al. ......................... 29/421 |
| 4,768,382 | 9/1988 | Varrese ................................. 73/715 |
| 4,928,376 | 5/1990 | Poglitsch ............................. 29/530 |
| 5,184,514 | 2/1993 | Cucci et al. .......................... 73/706 |
| 5,230,248 | 7/1993 | Cucci et al. .......................... 73/706 |
| 5,400,655 | 3/1995 | Tamai et al. ......................... 73/706 |
| 5,524,492 | 6/1996 | Frick et al. .......................... 73/706 |
| 5,551,299 | 9/1996 | Tamai et al. ......................... 73/706 |
| 5,718,826 | 2/1998 | Frejborg ............................... 210/402 |
| 5,922,965 | 7/1999 | Behm et al. ......................... 73/706 |

FOREIGN PATENT DOCUMENTS

| | | |
|---|---|---|
| 2088190 | 1/1972 | France . |
| 31 07 891 A1 | 9/1982 | Germany . |
| 44 35 909 A1 | 4/1995 | Germany . |
| 60-082827 | 11/1985 | Japan . |

OTHER PUBLICATIONS

"Differential And Gage Pressure Transmitters With Remote Seals", by Rosemount. Product Data Sheet PDS 4672, Rosemount Inc., 1992 (pp. 1–19).
"Model 1199 Seal Ordering & Application Program", by Fisher Rosemount. Rosemount, Inc., 1994 (pp. 2–4).
"Diaphragm Seals Innovations", by PI Components. Diaphragm Seals, 1997 (pp. 1–16).
Model 1199 Filled Systems, Fisher Rosemount 1997. (pp. 1–50).

*Primary Examiner*—Anthony Knight
*Assistant Examiner*—Alison K. Pickard
*Attorney, Agent, or Firm*—Westman, Champlin & Kelly, PA

[57] ABSTRACT

A process diaphragm seal includes a diaphragm seal body having a seal body ring portion surrounding a cavity and a diaphragm having a diaphragm ring portion. The diaphragm ring portion includes a diaphragm ring outer portion that corresponds to a seal body ring outer portion of the seal body ring portion and a diaphragm ring inner portion that corresponds to a seal body ring inner portion of the seal body ring portion. A first weld of the diaphragm ring outer portion to the seal body ring outer portion forms a closed path around the seal body ring portion. A second weld of the diaphragm ring inner portion to the seal body ring inner portion forms a closed path around the cavity. Between the first and second welds a diaphragm ring back surface is in substantially continuous contact with the seal body ring portion.

22 Claims, 6 Drawing Sheets

PROCESS DIAPHRAGM SEAL

BACKGROUND OF THE INVENTION

The present invention relates to the process industry. More specifically, the present invention relates to an isolation diaphragm or "diaphragm seal", of the type used to couple a process measurement instrument to a process.

Some types of process measurement instruments, such as pressure transmitters, have a pressure sensor, which is fluidically coupled to an isolation diaphragm by a fill fluid. The isolation diaphragm comprises part of a sub-assembly called a "remote seal" or a "diaphragm seal" and isolates the pressure sensor from corrosive process fluids being sensed. Pressure is transferred from the isolation diaphragm seal to the sensors through the fill fluid, which is substantially incompressible and fills a capillary tube connected between cavities in both the diaphragm seal and the sensor. When the process medium contacts the remote isolation diaphragm, its pressure is conveyed through the fill fluid to the pressure sensor disposed in the transmitter housing.

The diaphragm, also called a "membrane" is typically bonded to a diaphragm seal body, which supports the outer circumference of the active area of the diaphragm and allows the inner portion of the diaphragm to deflect in response to pressure changes in the process fluid. Some diaphragm seals use extended diaphragms that cover a diaphragm support area of the seal body to form a gasket surface. Such extended diaphragms are often found in diaphragm seals designed for corrosive fluids. By making the diaphragm out of a material that can withstand the corrosive process fluid and by expanding the diameter of the diaphragm to form a gasket surface, the seal body can be made out of a more common and less expensive material.

The diaphragm may be attached to the diaphragm support area of the seal body by brazing the two pieces together. However, the brazing process is somewhat expensive to utilize. To avoid the expense of brazing, the art has adopted the use of two concentric welds to bond the expanded diaphragm to the seal body. One of the concentric welds is made at the outer circumference of the diaphragm and the second weld is made at the inner circumference of the seal body's diaphragm support area.

Although using two concentric welds reduces the cost associated with attaching a diaphragm to a seal body as compared with brazing, prior art systems trapped air under the gasket surface of the diaphragm between the two concentric welds. This air makes the final product look flimsy and susceptible to damage. In addition, if the inner weld fails, the space created by the trapped air or the trapped air itself can change the operational characteristics of the sealed chamber. In addition, this air may expand if the seal system is exposed to vacuum, causing erroneous readings and possible damage to the diaphragm.

SUMMARY OF THE INVENTION

A process diaphragm seal includes a diaphragm seal body having a seal body ring portion surrounding a cavity and a diaphragm having an active diaphragm area that operates over the cavity and a diaphragm ring portion that surrounds the cavity. The diaphragm ring portion includes a diaphragm ring outer portion that corresponds to a seal body ring outer portion of the seal body ring portion and a diaphragm ring inner portion that corresponds to a seal body ring inner portion of the seal body ring portion. The diaphragm ring portion also includes a diaphragm ring back surface for contacting the seal body ring portion. A first weld of the diaphragm ring outer portion to the seal body ring outer portion forms a closed path around the seal body ring portion. A second weld of the diaphragm ring inner portion to the seal body ring inner portion forms a closed path around the cavity. Between the first and second welds the diaphragm ring back surface is in substantially continuous contact with the seal body ring portion.

DETAILED DESCRIPTION OF THE PREFERRED EMBODIMENTS

Figure 1:
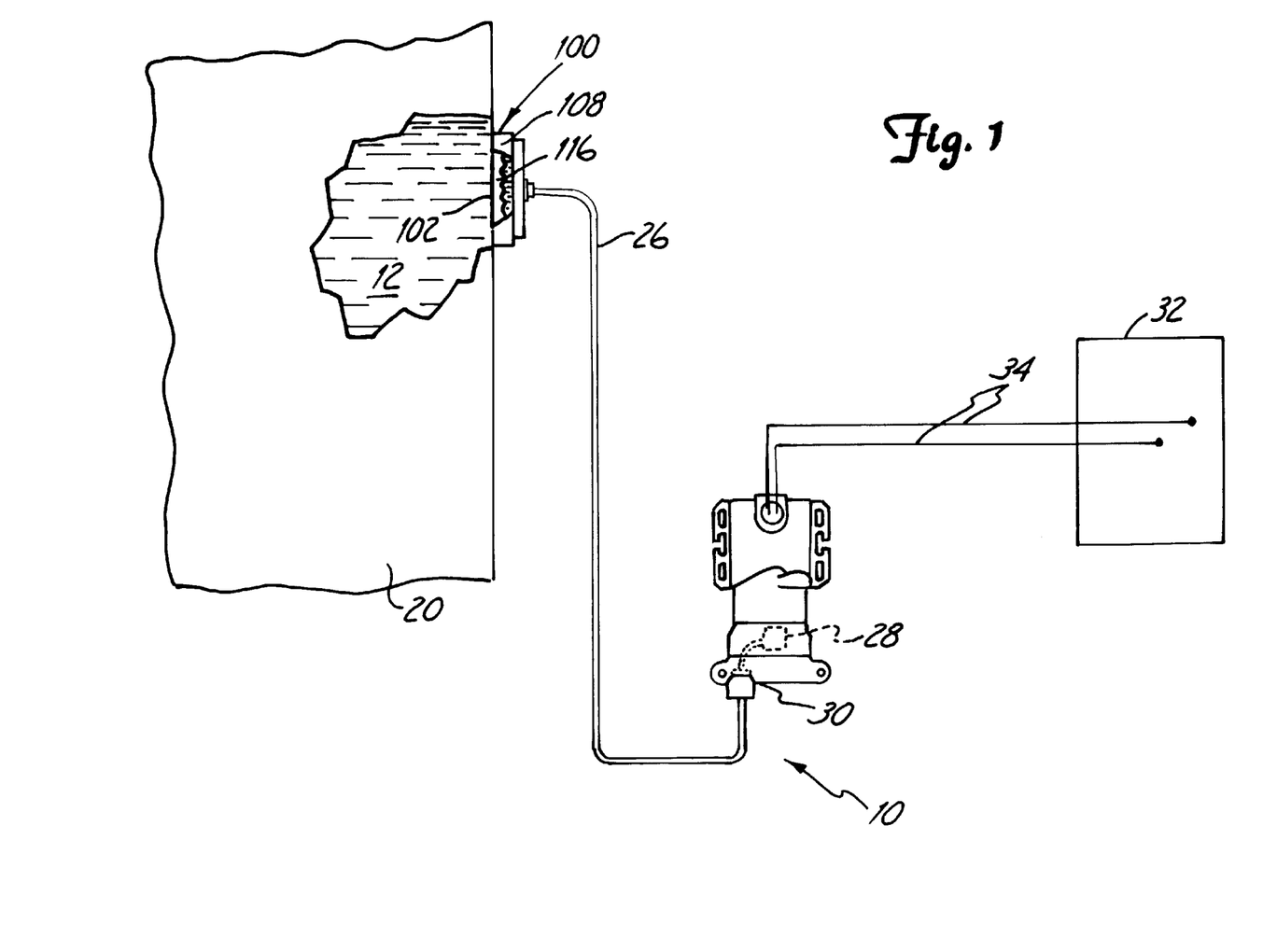
FIG. 1 is a plan diagram of a process diaphragm seal with a transmitter assembly.

FIG. 1 shows an embodiment of process diaphragm seal 100 of the present invention having body 108 and coupled to transmitter assembly 10 for sensing pressures of process fluid 12, which can be a liquid, gas, or slurry, in process container 20. Cavity 116 defined by diaphragm 102 includes a fill fluid and couples to capillary tube 26 which fluidically couples to transmitter diaphragm 30.

When process pressure is applied from process fluid 12, diaphragm 102 displaces the fill fluid, thereby transmitting a pressure to transmitter diaphragm 30 in transmitter assembly 10. Movements of diaphragm 30 are measured by transmitter sensor 28 through any one of a number of well known sensing methods including capacitive sensing, optical sensing and strain-gage sensing. Circuitry within transmitter assembly 10 converts the signal produced by transmitter sensor 28 into a form that is conducive for transmission to a remote location 32. Remote location 32 can include an indicator, a control system, or other device utilizing the transmitter output. Examples of such signals include digital and analog 4–20 mA signals, optical signals and signals following a Fieldbus protocol. Such signals may be carried over a pair of conductors 34 which also power assembly 10 or via fiber-optics.

Figure 2:
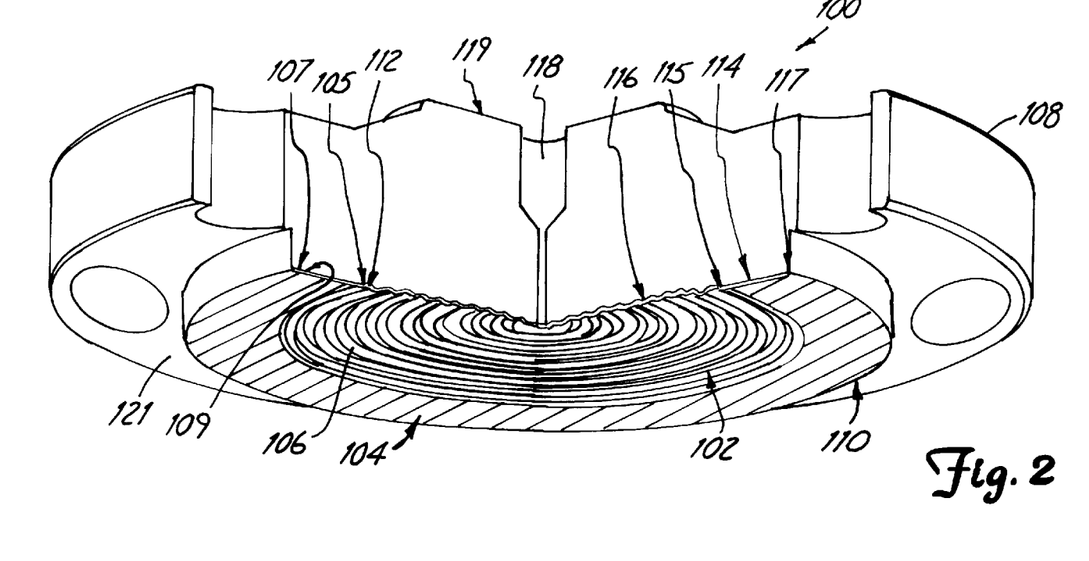
FIG. 2 is a partially cut away perspective view of the process diaphragm seal of the present invention
Figure 3:
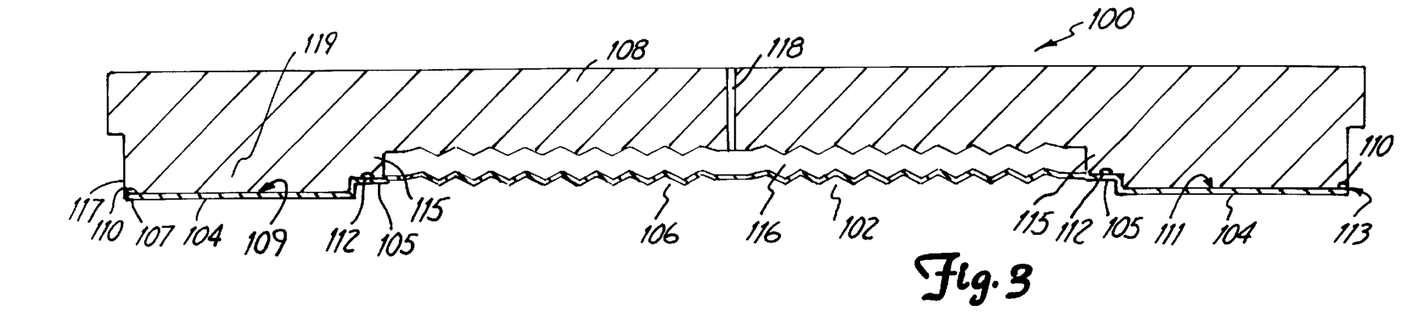
FIG. 3 is a cross-sectional view of the lower portion of the process diaphragm seal of FIG. 2.
Figure 8:
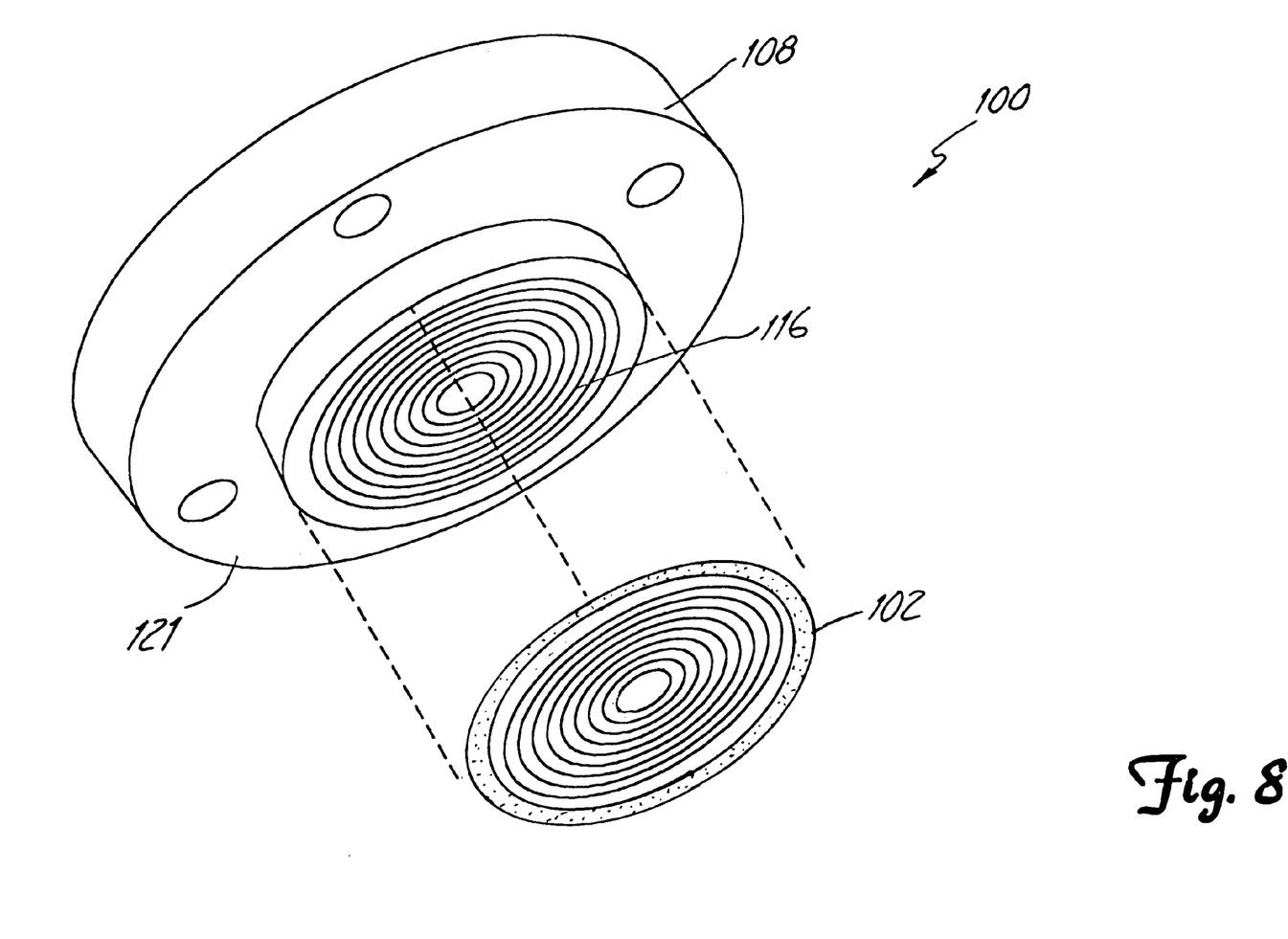
FIG. 8 is a perspective exploded view of one embodiment of the present invention.

FIGS. 2, 3 and 8 are a perspective view of a partially cut-away section, a cross-section view, and an exploded view, respectively, of a process diaphragm seal 100 of the present invention. Process diaphragm seal 100 includes diaphragm seal body 108 having a seal body ring portion 114 surrounding cavity 116. Seal body ring portion 114 includes seal body ring inner portion 115 near cavity 116 and seal body ring outer portion 117 farther away from cavity 116.

Process diaphragm seal 100 also includes diaphragm 102, which has an active area 106 that operates over cavity 116 and that is surrounded by a diaphragm ring portion 104, sized to correspond to seal body ring portion 114. Diaphragm ring portion 104 includes diaphragm ring inner portion 105 that corresponds to seal body ring inner portion 115, and diaphragm ring outer portion 107 that corresponds to seal body ring outer portion 117. Diaphragm ring portion 104 also includes diaphragm ring back surface 109 for contacting seal body ring portion 114.

A first weld 110 of diaphragm ring outer portion 107 to seal body ring outer portion 117 forms a closed path around seal body ring portion 114. A second weld 112 of diaphragm ring inner portion 105 to seal body ring inner portion 115 forms a closed path around the cavity. The diaphragm ring back surface 109 between first weld 110 and second weld 112 is in substantially continuous contact with seal body ring portion 114. One example of substantially continuous contact is when the diaphragm ring back surface directly interfaces with the seal body ring.

Figure 9:
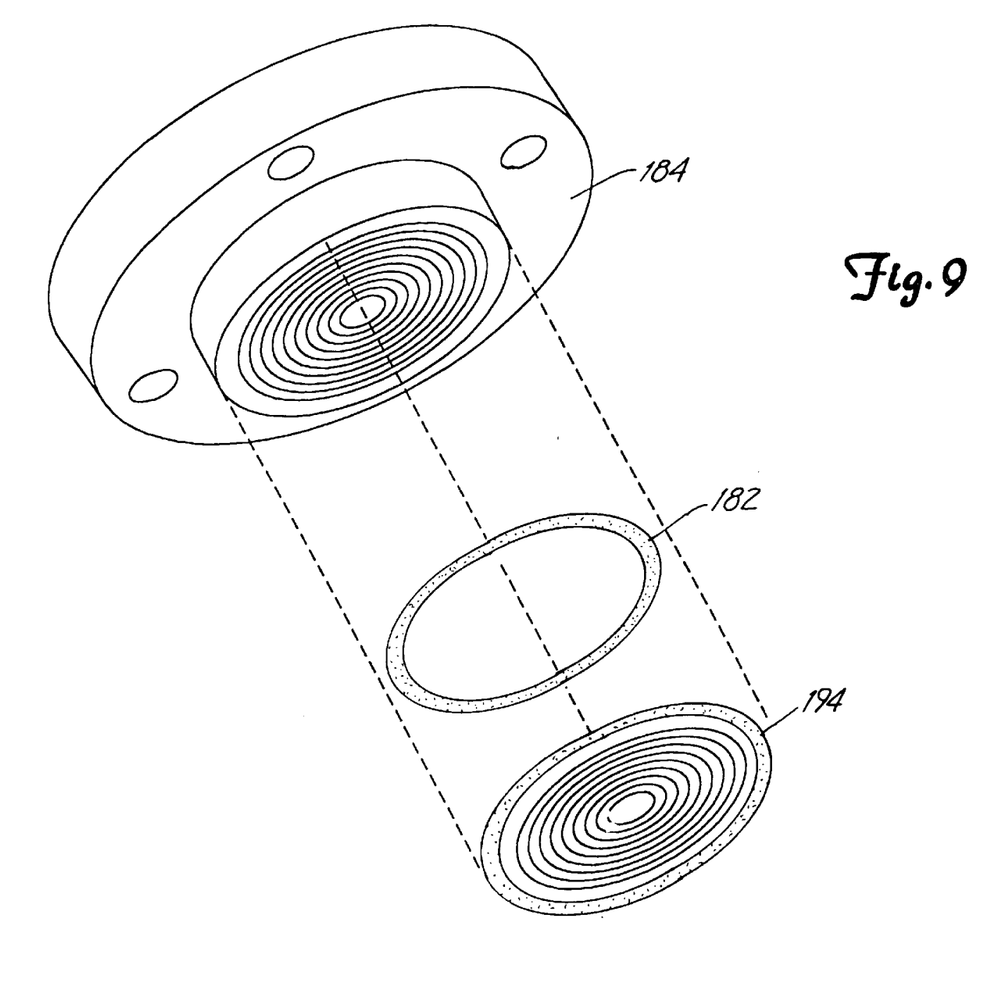
FIG. 9 is an exploded perspective view of a second embodiment of the present invention.

Diaphragm seal bodies 108 and 184 of FIGS. 2 and 9 respectively, are formed as flanged bodies, preferably meeting an ASME, DIN, JIS, or other industry standard. However, diaphragm seal bodies of the present invention are not limited to flanged bodies and may be formed as threaded bodies and bodies suitable for welding to or clamping to a process.

Figure 4:
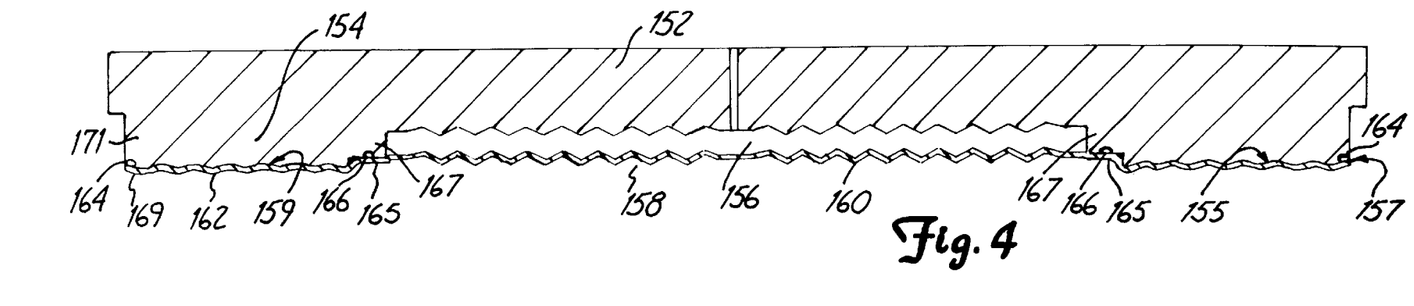
FIG. 4 is a cross-sectional view of a process diaphragm seal of the present invention with a contoured diaphragm gasket surface.

In two embodiments of the present invention, shown in cross-section in FIGS. 3 and 4, seal body ring portions 114 and 154 are parts of the same single material unit as the remainder of their respective diaphragm seal bodies 108 and 152. In such embodiments, the single material is typically stainless steel. For the embodiments of FIGS. 3 and 4 where diaphragm seal bodies 108 and 152 are made entirely of stainless steel, diaphragms 102 and 158 are preferably either made of stainless steel, or Tantalum. However, other materials such as Hastelloy-B, Hastelloy-C, Monel, and Inconel may be used. Although seal body ring portions 114 and 154 are shown as a raised boss in FIGS. 3 and 4, seal body ring portions of the present invention can be coplanar with surrounding portions of the seal body. In addition, although shown as being formed in the same piece of material as the remainder of the seal body in FIGS. 3 and 4, each seal body ring portion may be a separate piece that is welded or otherwise attached to the remainder of the seal body.

Figure 5:
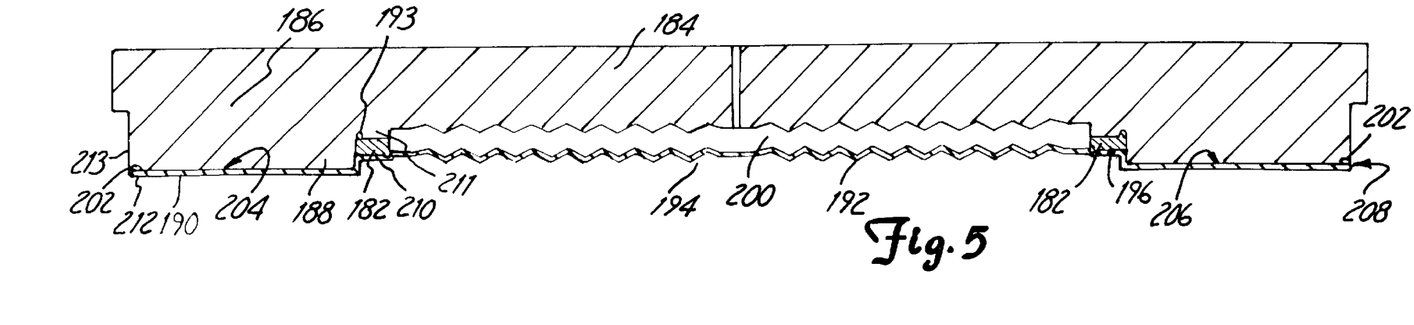
FIG. 5 is a cross-sectional view of a third embodiment of the present invention showing a process diaphragm seal with an inner weld ring.
Figure 6:
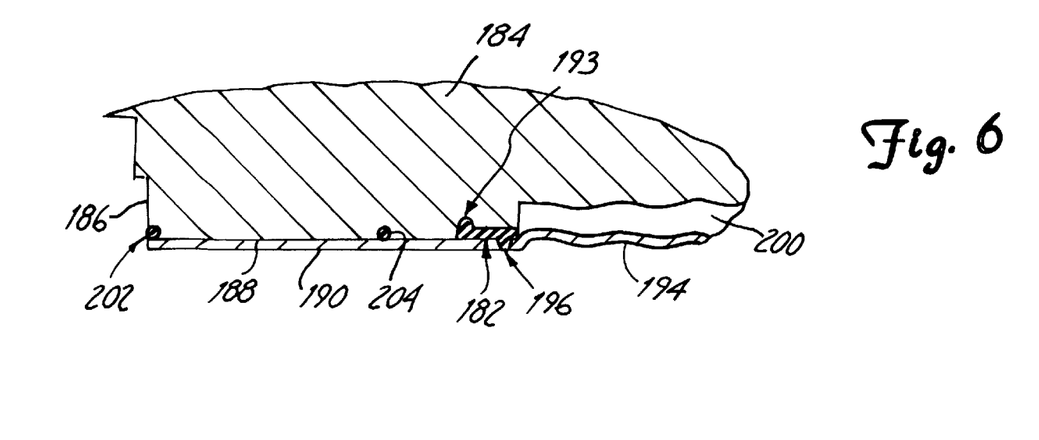
FIG. 6 is an expanded diagram of the process diaphragm serf FIG. 5.

In another embodiment of the present invention, shown in cross-section view in FIG. 5, expanded cross-section view in FIG. 6, and exploded perspective view in FIG. 9, seal body ring portion 186 includes weld ring 182 and support portion 188. Weld ring 182 is made from a different material than support portion 188 and is welded to support portion 188 by a weld 193, preferably a direct resistance seam weld. In such embodiments, diaphragm seal body 184 and support portion 188 are typically made of a single unit of stainless steel, while weld ring 182 and diaphragm 194 are constructed from matching materials like those identified by the Unified Numbering System (UNS) as N10665, N10276, N06022, N06600, N04400 or other metals that fuse with stainless steel. The diaphragm is subsequently welded to the weld ring through laser or resistance welding to assure that a pure alloy weld, one between parts made of the same alloy, is exposed to the process medium. Usually, pure alloy welds are more corrosion resistent than welds between dissimilar materials. Although shown as a raised boss in FIGS. 5, 6, and 9, a support portion of the present invention can be flush with surrounding portions of a seal body.

Cavities 116, 156, and 200 of FIGS. 3, 4, and 5, respectively, are designed to contain a fill liquid, which can be silicone oil, glycerin and water, propylene glycol and water, or any other suitable liquid. Cavity 116 of FIG. 3 is in fluid communication with a cavity passage 118 between cavity 116 and coupling side 119 of seal body 108. In some embodiments, cavities 116, 156, and 200 have contoured surfaces. Although cavities 116, 156, and 200 are shown as recesses in seal bodies 108, 152, and 184, respectively, these cavities could be formed by shaping the respective diaphragms so that they extend away from the respective seal bodies.

In the embodiments of FIGS. 3 and 5, seal body ring portion 114 and seal body ring portion 186, respectively, have substantially planar surfaces 111 and 206, that contact diaphragm ring back surfaces 109 and 204, respectively of diaphragms 102 and 194. Substantially planar surfaces 111 and 206 are respectively associated with substantially smooth gasket surfaces 113 and 208 that are the opposite sides of diaphragm ring portions 104 and 190 from diaphragm ring back surfaces 109 and 204, respectively.

In the embodiment of FIG. 4, seal body ring portion 154 has a contoured surface 155 that is associated with a contoured gasket surface 157 that is the opposite side of diaphragm ring portion 162 from diaphragm ring back surface 159. Contoured gasket surface 157 is useful when used with certain types of gaskets to mount the process diaphragm seal to a process fluid container. Contours such as concentric grooves or waves can be used.

In each of the embodiments shown in FIGS. 3, 4, and 5, diaphragms 102, 158, and 194, respectively, have active areas 106, 160, and 192 that are corrugated and respectively operate over cavities 116, 156, and 200. Diaphragm ring portions 104, 162, and 190 respectively surround active areas 106, 160, and 192 and include diaphragm ring inner portions 105, 165, and 210 that correspond to seal body ring inner portions 115, 167, and 211, of seal body ring portions 114, 154, and 186, respectively. Diaphragm ring portions 104, 162, and 190 also include diaphragm ring outer portions 107, 169, and 212 that respectively correspond to seal body ring outer portions 117, 171, and 213 of seal body ring portions 114, 154, and 186.

Diaphragm ring portions 104, 162, and 190 further include respective diaphragm ring back surfaces 109, 159, and 204, for respectively contacting seal body ring portions 114, 154, and 186. Specifically, diaphragm ring back surfaces 109, 159, and 204 are respectively in substantially continuous contact with seal body ring portions 114, 154, and 186. In preferred embodiments, to the extent diaphragm ring back surfaces 109, 159, and 204 are not in continuous contact with seal body ring portions 114, 154, and 186, a contact space exists that is substantially devoid of air. In such embodiments, if the inner weld fails, air will not change the operational characteristics of the diaphragm seal by entering the fill fluid because there is substantially no air trapped between the two welds. Also, there is no substantial empty volume for the fill fluid to flow into if the inner weld fails. The preferred embodiment also provides less potential for snagging or ripping the gasket surface foil because there is no "bubbling" of the foil.

In the embodiments of FIGS. 3, 4 and 5, first welds 110, 164, and 202 of diaphragm ring outer portions 107, 169, and 212, to seal body ring outer portions 117, 171, and 213, respectively, form closed paths around seal body ring portions 114, 154, and 186. Second welds 112, 166, and 196 of, respectively, diaphragm ring inner portions 105, 165, and 210 to seal body ring inner portions 115, 167, and 211 form closed paths around cavities 116, 156, and 200, respectively.

First welds 110, 164, and 202, are preferably Tungsten Insert Gas (TIG) welds, laser welds or direct resistance seam welds. Second welds 112, 166, and 196 are preferably direct resistance or laser seam welds formed by passing a current or light energy through a weld area. The welds can include small quantities of filler metals, applied by plating or other means to improve weld quality when there is a desire to avoid undesired melting of the diaphragm.

Figure 7:
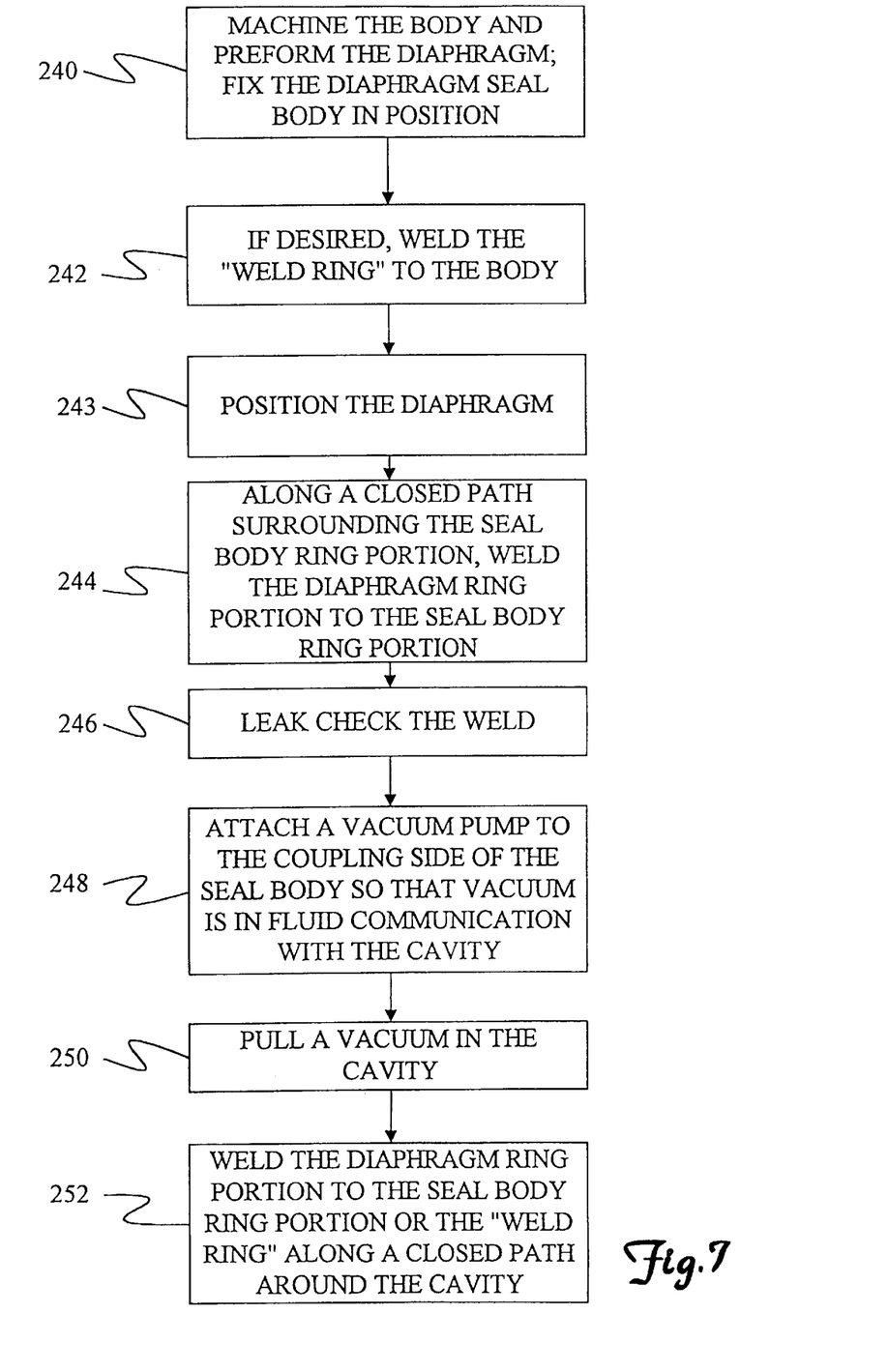
FIG. 7 is a flow diagram of a method of producing a diaphragm seal of the present invention.

FIG. 7 shows a flow diagram for producing a process diaphragm seal having a diaphragm attached to a seal body. The method of FIG. 7 involves fixing a diaphragm seal body in a predetermined diaphragm seal position, positioning a diaphragm so that a diaphragm ring portion of the diaphragm contacts a seal body ring portion of the diaphragm seal body, bonding the diaphragm ring with an to the seal body ring portion with a first closed path weld, creating a differential pressure across the diaphragm such that the diaphragm is deflected toward the seal body ring portion, and bonding the diaphragm ring portion to the seal body ring portion with a second closed path weld.

In greater detail, the flow diagram in FIG. 7 includes a first step 240 where the diaphragm seal body is machined and the diaphragm is pre-formed, if necessary, to match the contours of the diaphragm seal body. The diaphragm seal body is then fixed in a predetermined diaphragm seal body position. As shown in FIG. 2, the diaphragm seal body includes a diaphragm side 121, a coupling side 119, a cavity 116, a cavity passage 118 between cavity 116 and coupling side 119, and a seal body ring portion 114.

If desired, a weld ring is welded to the diaphragm seal body in step 242. Weld ring 182 of FIG. 5 is an example of such a weld ring. After steps 240 and 242, the diaphragm seal body and the diaphragm are prepared for bonding to one another in step 243 by positioning the diaphragm so that diaphragm ring portion 104 of FIG. 2 contacts seal body ring portion 114 of FIG. 2. In step 244, the diaphragm ring portion is welded to the seal body ring portion along a closed path that surrounds the seal body ring portion. At step 246, a leak check is performed on this closed path weld to insure that it is airtight.

In step 248, a vacuum pump is attached to the cavity passage on the coupling side of the seal body so that the vacuum chamber is in fluid communication with the cavity formed between the diaphragm and the seal body. In step 250, the vacuum pump is initiated to pull a vacuum in the cavity. This reduces the pressure within the cavity relative to the atmosphere and forces the diaphragm to deflect toward the seal body. In the alternative, an external pressure may be applied to the outer surface of the diaphragm to cause it to deflect toward the seal body. In either case, a differential pressure is created across the diaphragm such that the diaphragm is deflected toward the cavity and the seal body ring portion such that any space between the seal body ring portion and diaphragm ring portion is substantially devoid of air. Although both techniques for developing the differential pressure may be used, it is preferred that a vacuum be applied.

At step 252, while the vacuum is applied to the cavity, the diaphragm ring portion is bonded to the seal body ring portion or weld ring with a second weld that forms a closed path around the cavity in the seal body.

Although the present invention has been described with reference to preferred embodiments, workers skilled in the art will recognize that changes may be made in form and detail without departing from the spirit and scope of the invention. For example, the diaphragm seals may be used in transmitter assemblies directly and are not limited to remote seals.

What is claimed is:

1. A process diaphragm seal, comprising:
    a diaphragm seal body having a seal body ring portion surrounding a cavity for receiving a fill fluid, the seal body ring portion including a seal body ring inner portion near the cavity and a seal body ring outer portion farther away from the cavity than the seal body ring inner portion;
    a diaphragm having an active area that operates at least partially over the cavity and a diaphragm ring portion surrounding the active area and sized to correspond to the seal body ring portion, the diaphragm ring portion including a diaphragm ring inner portion that corresponds to the seal body ring inner portion, a diaphragm ring outer portion that corresponds to the seal body ring outer portion, and a diaphragm ring back surface for contacting the seal body ring portion;
    a first weld of the diaphragm ring outer portion to the seal body ring outer portion that forms a closed path around the seal body ring portion; and
    a second weld of the diaphragm ring inner portion to the seal body ring inner portion that forms a closed path around the cavity, wherein the diaphragm ring back surface between the first weld and the second weld is in substantially continuous contact with the seal body ring portion and wherein the opposite side of the diaphragm ring portion from the diaphragm ring back surface between the first weld and the second weld provides a gasket surface for contacting an opposing surface when the process diaphragm seal is installed in a process fluid container.

2. The process diaphragm seal as in claim 1 wherein a space between the diaphragm ring back surface and the seal body ring portion is substantially devoid of air.

3. The process diaphragm seal as in claim 1 wherein the gasket surface is substantially smooth.

4. The process diaphragm seal as in claim 1 wherein the seal body ring portion has a substantially planar surface that contacts the diaphragm ring back surface.

5. The process diaphragm seal as in claim 1 wherein the seal body ring portion has a contoured surface that contacts the diaphragm ring back surface.

6. The process diaphragm seal as in claim 1 wherein the diaphragm seal body comprises a weld ring welded to a remainder of the diaphragm seal body at the seal body ring inner portion of the seal body ring portion.

7. The process diaphragm seal as in claim 6 wherein the weld ring and the diaphragm are constructed of the same material.

8. The process diaphragm seal as in claim 7 wherein the weld ring is constructed of a different material than the remainder of the diaphragm seal body.

9. The process diaphragm seal as in claim 1 wherein the process diaphragm seal is coupled to a transmitter assembly for sensing a pressure of a process fluid.

10. A process diaphragm seal, comprising:
    a diaphragm seal body having a seal body ring portion surrounding a cavity for receiving a fill fluid, the seal body ring portion including a seal body ring inner portion near the cavity and a seal body ring outer portion farther away from the cavity than the seal body ring inner portion;
    a diaphragm having an active area that operates over the cavity and a diaphragm ring portion surrounding the active area sized to correspond to the seal body ring portion, the diaphragm active area being corrugated, the diaphragm ring portion includes a diaphragm ring inner portion that corresponds to the seal body ring inner portion, a diaphragm ring outer portion that corresponds to the seal body ring outer portion, and a diaphragm ring back surface for contacting the seal body ring portion; and attachment means for attaching the diaphragm ring portion to the seal body ring portion such that the diaphragm ring back surface is in substantially continuous contact with the seal body ring portion.

11. The process diaphragm seal as in claim 10 wherein a space between the diaphragm ring back surface and the seal body ring portion is substantially devoid of air.

12. The process diaphragm seal as in claim 10 further comprising a gasket surface that is the opposite side of the diaphragm ring portion from the diaphragm ring back surface, wherein the gasket surface is substantially smooth.

13. The process diaphragm seal as in claim 10 wherein the seal body ring portion has a substantially planar surface that contacts the diaphragm ring back surface.

14. The process diaphragm seal as in claim 10 wherein the seal body ring portion has a contoured surface that contacts the diaphragm ring back surface.

15. The process diaphragm seal as in claim 10 wherein the diaphragm seal body comprises a weld ring welded to a remainder of the diaphragm seal body at the seal body ring inner portion of the seal body ring portion.

16. The process diaphragm seal as in claim 15 wherein the weld ring and the diaphragm are constructed of the same material.

17. The process diaphragm seal as in claim 16 wherein the weld ring is constructed of a different material than the remainder of the diaphragm seal body.

18. The process diaphragm seal as in claim 10 wherein the process diaphragm seal is coupled to a transmitter assembly for sensing a pressure of a process fluid.

19. A method for producing a process diaphragm seal, comprising:

fixing in a predetermined diaphragm seal body position a diaphragm seal body having a diaphragm side, a coupling side, a cavity on the diaphragm side, a cavity passage between the cavity and the coupling side, and a seal body ring portion surrounding the cavity;

positioning a diaphragm having an active area and a diaphragm ring portion so that the diaphragm ring portion contacts the seal body ring portion;

bonding the diaphragm ring portion to the seal body ring portion with a first weld that forms a closed path around the seal body ring portion and the cavity;

creating a differential pressure across the diaphragm such that the diaphragm is deflected toward the cavity and seal body ring portion such that a space between the seal body ring portion and the diaphragm ring portion is substantially devoid of air; and while maintaining the differential pressure, bonding the diaphragm ring portion to the seal body ring portion with a second weld that forms a closed path around the cavity.

20. The method of claim 19 wherein the differential pressure is created by pulling a vacuum in the cavity through the cavity passage.

21. The method of claim 19 wherein the second weld is a direct resistance seam weld.

22. The method of claim 19 wherein the second weld is a laser seam weld.

* * * * *